United States Patent [19]

Stone

[11] Patent Number: 5,735,032
[45] Date of Patent: Apr. 7, 1998

[54] TRIM WELT INSTALLATION TOOL

[75] Inventor: Charles L. Stone, Metamora, Mich.

[73] Assignee: Chrysler Corporation, Auburn Hills, Mich.

[21] Appl. No.: 647,848

[22] Filed: May 15, 1996

[51] Int. Cl.⁶ .................................................. B23P 19/02
[52] U.S. Cl. ............................................................. 29/235
[58] Field of Search ...................................... 29/235, 238

[56] References Cited

U.S. PATENT DOCUMENTS

| | | | |
|---|---|---|---|
| 3,284,886 | 11/1966 | Provencher | 29/235 |
| 4,172,313 | 10/1979 | Takahashi | 29/235 |
| 4,620,354 | 11/1986 | Hess et al. | 29/235 |
| 4,780,943 | 11/1988 | St. Angelo et al. | 29/235 |
| 4,899,429 | 2/1990 | Londono | 29/235 |
| 5,169,081 | 12/1992 | Goedderz | 29/235 |
| 5,237,741 | 8/1993 | Goedderz | 29/235 |
| 5,243,747 | 9/1993 | Mesnel et al. | 29/235 |

*Primary Examiner*—Robert C. Watson
*Attorney, Agent, or Firm*—Thomas G. Pasternak

[57] ABSTRACT

A trim welt installation tool for installing a trim welt on at least one flange around an opening includes a support frame having at least one roller rotatably connected thereto for engaging a trim welt and a guide member operatively connected to the support frame for guiding the at least one roller along the trim welt.

12 Claims, 2 Drawing Sheets

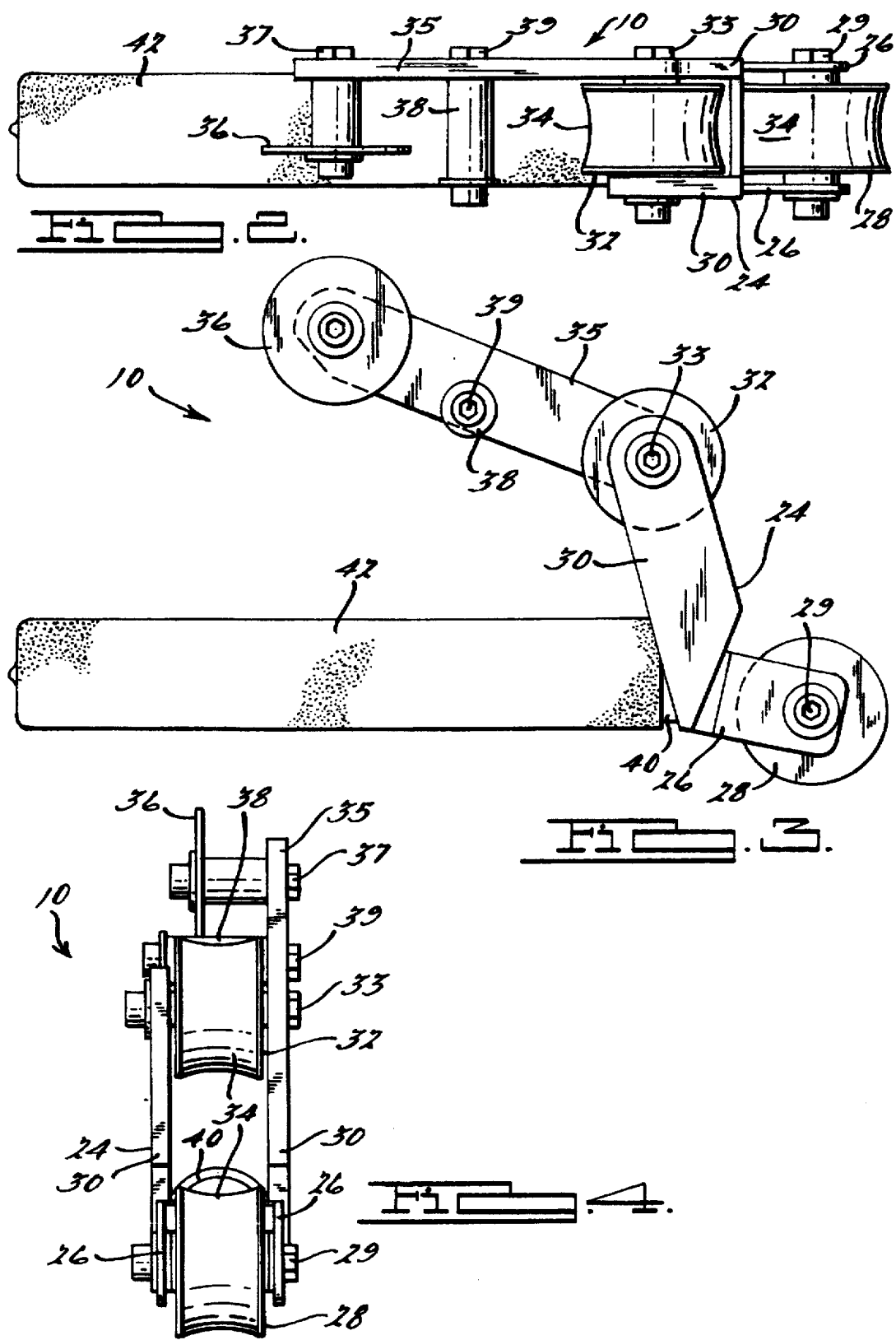

TRIM WELT INSTALLATION TOOL

BACKGROUND OF THE INVENTION

1. Field of the Invention

The present invention relates generally to trim welts and, more particularly, to a tool for installing a trim welt around an opening on an automotive vehicle.

2. Description of the Related Art

Typically, a trim welt is used on flanges surrounding an opening such as a door opening on an automotive vehicle to conceal or close a gap between the flanges of the door opening. Generally, the trim welt has a U-shaped core member forming a channel and an outer skin surrounding the interior and exterior of the core member. The outer skin has inwardly projecting retaining members extending within the channel which are adapted to grip or couple with the flanges of the door opening to retain the trim welt to the flanges.

To install the trim welt, a heat lamp is used to warm the trim welt as required. An operator positions the trim welt to an upper apex B-pillar corner of the door opening with a color dot on the trim welt. The operator then positions the trim welt over the flanges of the door opening and works the trim welt in both directions with their fingers using padded gloves to completely seat the trim welt so no gaping occurs between the trim welt on the flanges and the door opening.

One disadvantage of the above installation of the trim welt is that the trim welt is installed manually. As a result, the installation is relatively slow and may not be repeated with precision. Another disadvantage of the installation of the trim welt is that the manual installation by the operator is not ergonomic to the operator.

SUMMARY OF THE INVENTION

It is, therefore, one object of the present invention to provide a trim welt installation tool for installing a trim welt around an opening on an automotive vehicle.

It is another object of the present invention to provide a trim welt installation tool that is lightweight and effective for installing a trim welt around an opening on an automotive vehicle.

It is yet another object of the present invention to provide a trim welt installation tool for installing a trim welt around an opening on an automotive vehicle that is ergonomic to the operator.

To achieve the foregoing object, the present invention is a trim welt installation tool for installing a trim welt on at least one flange around an opening of an automotive vehicle. The trim welt installation tool includes a support frame having at least one roller rotatably connected thereto for engaging a trim welt and a guide member operatively connected to the support frame for guiding the at least one roller along the trim welt.

One advantage of the present invention is that a trim welt installation tool is provided for installing a trim welt to a desired position on at least one flange around an opening on an automotive vehicle. Another advantage of the present invention is that the trim welt installation tool is ergonomic to the operator and improves the quality of the installation of the trim welt. A further advantage of the present invention is that the trim welt installation tool requires less time and money to install the trim welt.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 3 is a front view of the trim welt installation tool of FIG. 1.

FIG. 4 is a side view of the trim welt installation tool of FIG. 1.

FIG. 5 is an enlarged partial front view of the trim welt installation tool and trim welt and automotive vehicle of FIG. 1.

DESCRIPTION OF THE PREFERRED EMBODIMENT(S)

Figure 1:
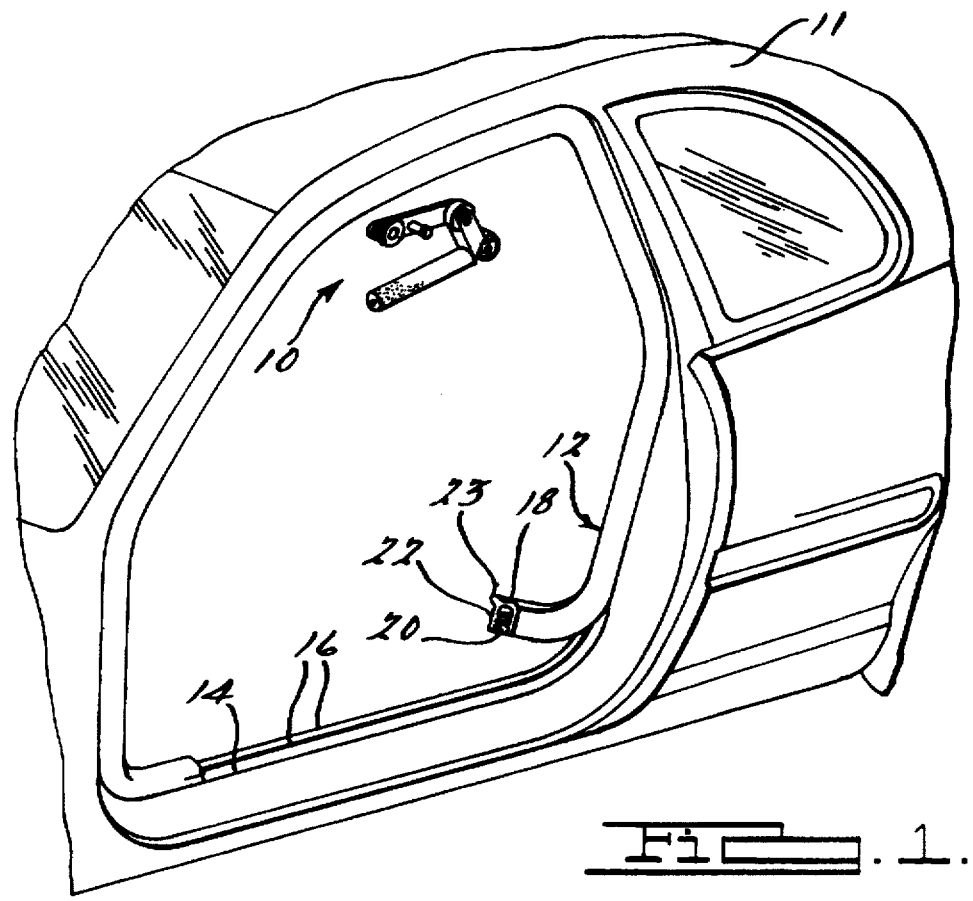
FIG. 1 is a partial perspective view of a trim welt installation tool, according to the present invention, illustrated in operational relationship with a trim welt and an automotive vehicle.

Referring to FIG. 1, a trim welt installation tool 10, according to the present invention, is illustrated in operational relationship with an automotive vehicle 11 and a trim welt, generally indicated at 12. The vehicle 11 includes an opening such as a door opening 14 to contain a door (not shown). The vehicle 11 also includes at least one, preferably a pair of flanges 16 peripherally extending into the door opening 14. It should be appreciated the trim welt 12 couples with or grips the flanges 16 to close or seal a gap between the flanges 16 and conceal the gap from external view.

The trim welt 12 includes a core member 18 having an outer skin formed to a generally U-shaped configuration to define a channel 20. The trim welt 12 includes a plurality of retaining members 22 extending from the outer skin and inwardly into the channel 20. The retaining members 22 grip or couple with the flanges 16 to retain the trim welt 12 onto the flanges 16. The trim welt 12 may include a trim sealing lip 23 extending outwardly from one side of the outer skin. It should be appreciated that the trim welt 12 is conventional in construction and known in the art.

Figure 2:
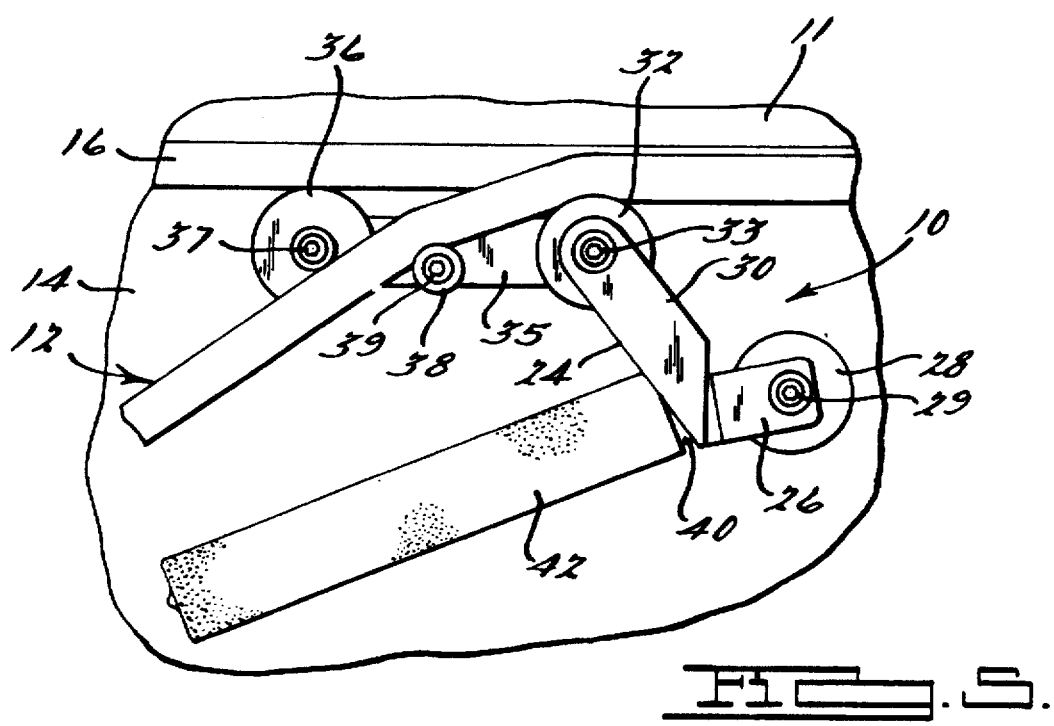
FIG. 2 is a plan view of the trim welt installation tool of FIG. 1.

Referring to FIGS. 2 through 4, the trim welt installation tool 10, according to the present invention, is used for installing the trim welt 12 on the flanges 16. The trim welt installation tool 10 includes a support frame 24 having a generally "L" shape. The support frame 24 is made of a relatively light-weight material such as aluminum or aluminum alloy. The support frame 24 includes at least one, preferably a pair of first arms 26 spaced laterally and a first roller 28 disposed between and rotatably connected to the first arms 26 by suitable means such as a fastener 29. The support frame 24 also includes at least one, preferably a pair of second arms 30 spaced laterally and a second roller 32 disposed between and rotatably connected by suitable means such as a fastener 33 to the second arms 30 of the support frame 24. The first roller 28 and second roller 32 are generally circular in shape and have an outer surface 34 which is concave and complementary to the curved outer surface of the core member 18 of the trim welt 12. The first roller 28 and second roller 32 are made of a relatively soft material having a durometer of preferably approximately four hundred (400). It should be appreciated that the support frame 24 is integral and formed as one-piece.

The trim welt installation tool 10 also includes a guide frame 35 pivotally connected to at least one of the second arms 30 of the support frame 24 by the fastener 33. The guide frame 35 extends longitudinally and outwardly at an angle. The guide frame 35 is made of a relatively light-weight material such as aluminum. The guide frame 35 includes a guide roller 36 rotatably connected to the guide frame 35 by suitable means such as a fastener 37. The guide roller 36 is generally circular in shape and has a lateral width less than the lateral width of the first and second rollers.

The trim welt installation tool 10 includes an idler 38 rotatably connected to the guide frame 35 by suitable means such as a fastener 39. The idler 38 is generally cylindrical in shape and has a laterally width greater than the guide roller 36. The idler 38 is made of a relatively hard material such as plastic. The idler 38 has a diameter less than a diameter of the guide roller 36 and spaced therefrom such that the guide roller 36 is partially disposed in the channel 20 of the trim welt 12. It should be appreciated that the guide roller 36 may be made of a sufficient diameter to be disposed in the channel 20 as illustrated in FIG. 5.

The trim welt installation tool 10 also includes a handle 40 extending longitudinally and connected to the support frame 24. The handle 40 is tubular and circular in shape. The handle 40 is made of a light-weight material such as aluminum. The handle 40 may include a cover 42 made of a relatively soft material such as foam. It should be appreciated that the handle 40 has a sufficient length to be grasped by both hands of an operator. It should also be appreciated that the handle 40 may be integral and formed as one-piece with the support frame 24.

In operation, the trim welt 12 may be installed on the flanges 16 by the trim welt installation tool 10 as illustrated in FIG. 5. An operator grips the handle 40 of the tool 10 and disposes the guide roller 36 in the channel 20 of the trim welt 12 and disposes the trim welt 12 between the guide roller 36 and the idler 38. The operator uses the first roller 28 to start or dispose the trim welt 12 in an upper apex corner of the door opening 14. The operator moves the tool 10 along the trim welt 12 and flanges 16 with sufficient force such that the second roller 32 contacts the core member 18 and presses the flanges 16 in the channel 20 of the trim welt 12. As a result, the flanges 16 are disposed in the channel 20 of the trim welt 12 and the retaining members 22 grip the flanges 16 to secure the trim welt 12 to the flanges 16.

Accordingly, the trim welt installation tool 10 provides a simple and inexpensive tool to correctly install the trim welt 12 on at least one flange 16 around an opening 14. The trim welt installation tool 10 eliminates the need for the operator's fingers to install the trim welt 10 and is more ergonomic to the operator.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A trim welt installation tool for installing a trim welt on at least one flange around an opening comprising:
    a support frame having at least one roller rotatably connected thereto for engaging a trim welt;
    a guide frame pivotally connected to said support frame and extending longitudinally and outwardly and a guide roller rotatably connected to said guide frame for guiding said at least one roller along the trim welt; and
    an idler rotatably connected to said guide frame between said guide roller and said at least one roller for allowing the trim welt to be disposed between said guide roller and said idler.

2. A trim welt installation tool as set forth in claim 1 including a handle connected to said support frame.

3. A trim welt installation tool as set forth in claim 1 including a second roller rotatably connected to said support frame.

4. A trim welt installation tool for installing a trim welt on at least one flange around an opening comprising:
    a support frame having at least one contact roller rotatably connected thereto for engaging a trim welt;
    a guide frame pivotally connected to said support frame and extending longitudinally and outwardly at an angle and a guide roller rotatably connected to said guide frame for guiding said at least one contact roller along the trim welt;
    an idler rotatably connected to said guide frame between said guide roller and said at least one contact roller for allowing the trim welt to be disposed between the guide roller and said idler; and
    a handle connected to said support frame.

5. A trim welt installation tool as set forth in claim 4 including an idler rotatably connected to said guide member for allowing the trim welt to be disposed between said guide member and said idler.

6. A trim welt installation tool as set forth in claim 5 wherein said idler is cylindrical in shape.

7. A trim welt installation tool as set forth in claim 5 wherein said idler is made of a plastic material.

8. A trim welt installation tool as set forth in claim 5 wherein said guide roller has a diameter greater than a diameter of said idler.

9. A trim welt installation tool as set forth in claim 5 wherein said guide roller has a width less than a width of said at least one contact roller.

10. A trim welt installation tool as set forth in claim 4 wherein said support frame is made of an aluminum or aluminum alloy.

11. A trim welt installation tool as set forth in claim 4 including a second contact roller rotatably connected to said support frame.

12. A trim welt installation tool as set forth in claim 4 wherein said at least one contact roller has an outer surface concave and complimentary to the trim welt.

* * * * *